ically compiling the schematic and layout of each

United States Patent

Beakes et al.

[11] Patent Number: 6,131,182
[45] Date of Patent: Oct. 10, 2000

[54] METHOD AND APPARATUS FOR SYNTHESIZING AND OPTIMIZING CONTROL LOGIC BASED ON SRCMOS LOGIC ARRAY MACROS

[75] Inventors: Michael Patrick Beakes, Yorktown Heights, N.Y.; Barbara Alana Chappell; Terry Ivan Chappell, both of Portland, Oreg.; Gary S. Ditlow, Garrison, N.Y.; Barry Lee Dorfman, Austin, Tex.; Bruce Martin Fleischer, Mount Kisco, N.Y.; Vinod Narayanan, Fishkill, N.Y.; Robert Alan Philhower, Carmel, N.Y.; George Anthony Sai Halasz, Mount Kisco, N.Y.; Ghavam Ghavami Shahidi, Emsford, N.Y.; David James Widiger, Pflugerville, Tex.

[73] Assignee: International Business Machines Corporation, Armonk, N.Y.

[21] Appl. No.: 08/850,037

[22] Filed: May 2, 1997

[51] Int. Cl.[7] .................................................. G06F 17/50
[52] U.S. Cl. ...................................... 716/8; 716/9; 716/12
[58] Field of Search .................................... 364/488, 489, 364/490, 491; 382/145; 716/8

[56] References Cited

U.S. PATENT DOCUMENTS 5,086,477  2/1992  Yu .......................................... 382/145
5,461,577  10/1995  Shaw ........................................ 364/491
5,801,958  9/1998  Dangelo et al. .......................... 364/489

Primary Examiner—Paul R. Lintz
Assistant Examiner—Thuan Do
Attorney, Agent, or Firm—F. Chau & Associates, LLP

[57] ABSTRACT

A computer-based method automatically synthesizes, optimizes and compiles high performance control logic using SRCMOS LOGIC ARRAY MACROS, abbreviated as SLAMs. The method includes a series of steps that transform a high level design description into a set of SLAMs, and includes the steps of partitioning the logic description of a unit into blocks that are suitable for mapping to a target SLAM structure; mapping each logic partition to the target SLAM structure; creating a configuration and relative layout for the internal structure for each SLAM; creating an external description for each SLAM, each description being of sufficient detail to carry out physical design and integration of the unit which contains the SLAM; assembling the partitions implemented as SLAMs with other macros in the unit; resolving interface conflicts between the different macros by selecting appropriate signal interfaces for various SLAMs; repeatedly changing the external specifications of the various SLAMs; analyzing the performance of the unit; automatically compiling the schematic and layout of each SLAM within the unit based on the configuration and relative layout; and assembling the macros and analyzing the design for design rule violations.

31 Claims, 5 Drawing Sheets

| Parameters | Symbolic View | Physical View |
|---|---|---|
| CONST=FALSE<br>CVALUE=x | 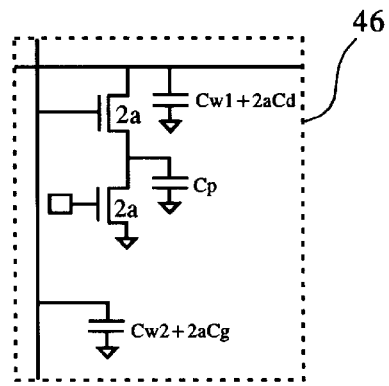<br>FIG. 3A | 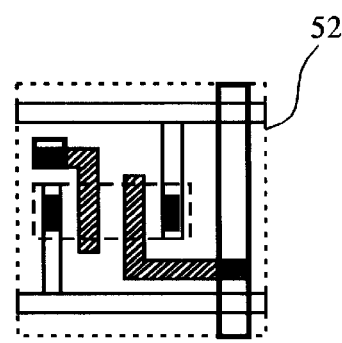<br>FIG. 4A |
| CONST=TRUE<br>CVALUE=1 | 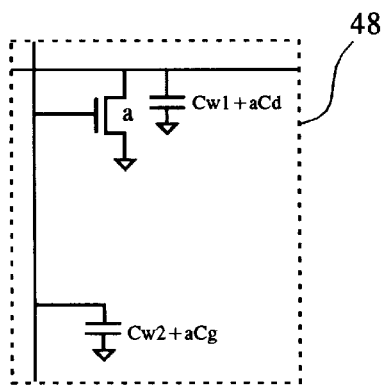<br>FIG. 3B | 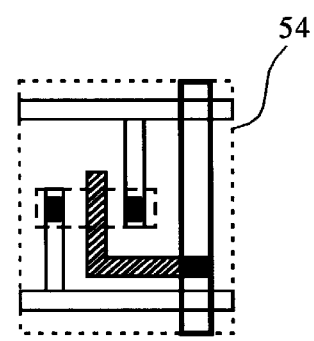<br>FIG. 4B |
| CONST=TRUE<br>CVALUE=0 | 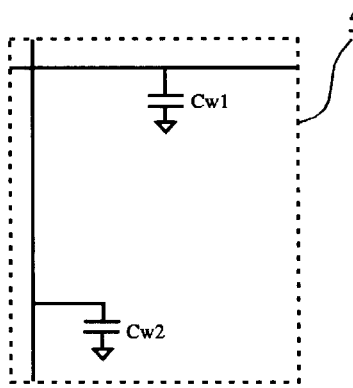<br>FIG. 3C | 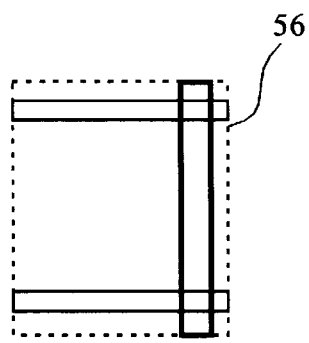<br>FIG. 4C |

METHOD AND APPARATUS FOR SYNTHESIZING AND OPTIMIZING CONTROL LOGIC BASED ON SRCMOS LOGIC ARRAY MACROS

BACKGROUND INFORMATION

1. Technical Field

This disclosure relates generally to processes for automatically compiling and optimizing control logic for high performance digital integrated circuits, and more particularly to a method for automatically compiling high performance control logic implemented using self-resetting complementary metal oxide semiconductor (SRCMOS) circuit techniques.

2. Description of the Related Art

Integrated circuits may be designed to provide logic structures forming self-resetting complementary metal oxide semiconductor (SRCMOS) circuits, as described in U.S. Pat. No. 4,845,677 to Chappell et al., entitled "Pipelined Memory Chip Structure Having Improved Access Time"; in Chappell et al., "A 2-ns Cycle Time 3.8 ns Access 512-kb CMOSECL SRAM With a Fully Pipelined Architecture", IEEE JOURNAL OF SOLID STATE CIRCUITS, VOL. 26, NO. 11, November 1991; and in U.S. Pat. No. 5,576,644, each of which are incorporated herein by reference.

SRCMOS may be used to implement SRCMOS Logic Array Macros (SLAMs), such as described in commonly assigned U.S. patent applications entitled "COMPILED SELF-RESETTING CMOS LOGIC ARRAY MACROS" and "A METHOD AND APPARATUS FOR GENERATING BIT-SLICE MACROS", which are being filed concurrently with this application, and which are incorporated herein by reference.

In fabricating high performance integrated circuits or chips to implement such SLAMs, a hierarchical design process is typically followed, in which a chip is divided into units, which are then further subdivided into macros, which are defined herein as subdivisions of a unit of a chip or integrated circuit (IC). Each macro is then implemented using a particular design and layout strategy. Some distinction is usually made between datapath macros, which process data, and control logic macros, which control the operations that are performed on the data.

Datapaths usually employ very regular structures which are repeated many times. In the current state of the art of high performance microprocessor design, the datapaths are usually designed using full-custom design styles, such as described in Este and Eshraghian, "Principles of CMOS VLSI Design", ADDISON WESLEY, 1991. Such full-custom design styles typically require that the definition of the logic be fairly complete before the design activity may proceed, which is an acceptable condition for datapath elements having well known and fairly standard interfaces. Also, by following this highly customized design style, one can achieve high performance for the datapath elements.

Designing and laying out control logic is very different from designing and laying out datapath elements. Since the speed at which datapath elements may run is determined by the speed of the logic which controls them, it is imperative that control logic also be designed to work at such high speeds. The specifications of the control logic tend to change throughout the design process, which accordingly requires fast turn-around in design, implementation, and testing. As described in L. Stok et al., "Booledozer: Logic Synthesis for ASICs", IBM JOURNAL OF RESEARCH AND DEVELOPMENT, VOL. 40, NO. 4, pp. 407–430; current state of the art techniques implement logic synthesis based on standard cells, which provides relatively fast turn-around, but typically does not support the performance that may be achieved in datapaths using dynamic circuitry, and in particular, SRCMOS circuitry.

Although a customized design style for control circuits results in improved control circuits with good performance, such a customized design style is not desirable due to the long turn-around time. Therefore, a need exists for a method and structures which facilitate quick design and implementation turn-around of control circuits while providing performance comparable to a full-custom design style.

SUMMARY

It is recognized herein that implementation of automated methods to the design of control circuits produces circuits with high performance.

A computer-based method is disclosed to synthesize, optimize and compile high performance control logic using a SLAMs. The method includes a series of steps that transform a high level design description into a set of SLAMS. The method includes the steps of partitioning the logic description of a unit into blocks that are suitable for mapping to a target SLAM structure; mapping each logic partition to the target SLAM structure; creating a configuration and relative layout for the internal structure for each SLAM; creating an external description for each SLAM, each description being of sufficient detail to carry out physical design and integration of the unit which contains the SLAM; assembling the partitions implemented as SLAMs with other macros in the unit; resolving interface conflicts between the different macros by selecting appropriate signal interfaces for various SLAMs; repeatedly changing the external specifications of the various SLAMs; analyzing the performance of the unit; automatically compiling the schematic and layout of each individual SLAM within the unit based on the configuration and relative layout; and assembling the various macros that include the unit and analyzing the design of the unit for design rule violations.

The process culminates with a verified physical layout and associated schematic for each SLAM. Each SLAM is automatically compiled using a construct called a circuit tile, which allow the representation of parameterized building blocks to facilitate the automatic compilation process. The method provides for the compilation of schematics and layouts with predictable performance. The circuits thus compiled have performance characteristics comparable to custom hand-designed circuits, while the design process is comparable in turn-around time and flexibility to automatic synthesis techniques.

BRIEF DESCRIPTION OF THE DRAWINGS

The features of the disclosed computer-based circuit synthesis method will become more readily apparent and may be better understood by referring to the following detailed description of illustrative embodiments of the present invention, taken in conjunction with the accompanying drawings, in which:

FIGS. 3A–3C are symbolic views which show a schematic representation of circuit tiles;

FIGS. 4A–4C are physical views of the circuit tiles which show the layout represented by the circuit schematics shown in FIGS. 3A–3C, respectively.

DESCRIPTION OF THE PREFERRED EMBODIMENTS

Figure 1:
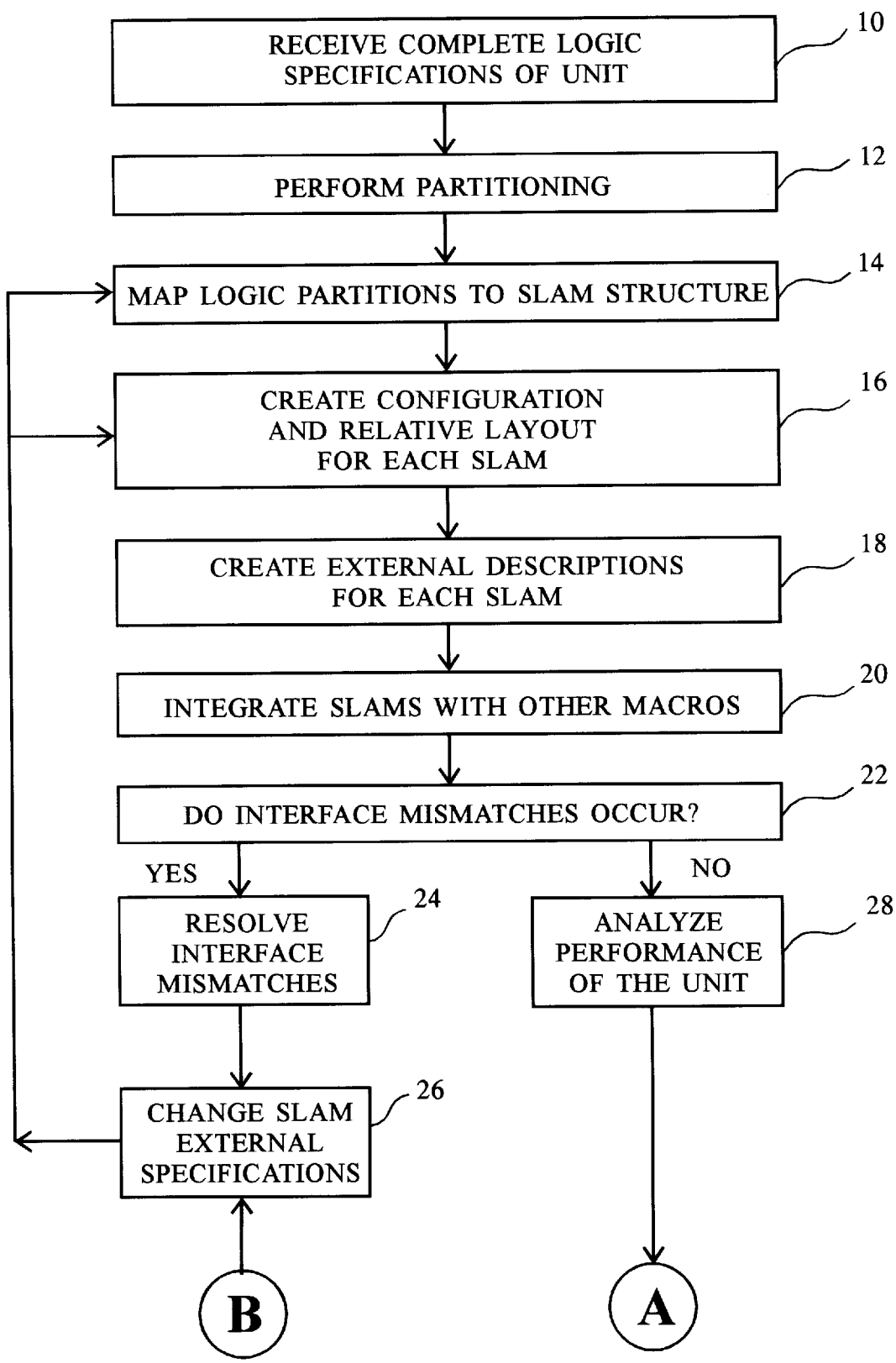
FIGS. 1–2 are high-level flowcharts of the various steps of the disclosed computer-based method for synthesizing, optimizing and compiling SLAMs.

Referring now in specific detail to the drawings, with like reference numerals identifying similar or identical elements, as shown in FIG. 1, a computer-based circuit synthesis method is shown for producing self-resetting complementary metal oxide semiconductor (SRCMOS) Logic Array Macros (SLAM) circuit structures such as described in commonly assigned U.S. patent applications entitled "COMPILED SELF-RESETTING CMOS LOGIC ARRAY MACROS" and "A METHOD AND APPARATUS FOR GENERATING BIT-SLICE MACROS", which are being filed concurrently with this application, and which are incorporated herein by reference.

The method may be implemented using a computer-based apparatus and program to automatically provide accurate and high-speed implementation of the disclosed method for automatically synthesizing, compiling and optimizing control logic into SLAMs. In an illustrative embodiment, the method is performed by a computer system, such as an "IBM RISC SYSTEM/6000" computer available from "IBM", executing a set of computer programs generated from source code written, for example, in the C/C++ programming language, for generating an optimized design for control logic in an IC.

The disclosed method performed by such a computer system produces control logic in the form of SRCMOS circuitry organized as SLAMs. When implemented in conjunction with datapath macros, such control logic circuitry provides a CMOS circuit which accurately implements functions described by predetermined logic specifications, and also meets specified performance goals.

While the disclosed method is usually applied to control logic, it may also be applied to datapath logic, with some loss in efficiency. The disclosed method is adapted to generate such a CMOS circuit which satisfies all technology constrainst; i.e. design rules, of a specified CMOS technology, to facilitate manufacture of the CMOS circuit with accurate construction.

The disclosed method uses a hierarchical design style, with a chip implementing the circuit being designed to be composed of a set of units, with each unit further including of a set of macros, or subunits of the IC. Each macro is designed individually, and the macros are combined to form the unit, with the units combined together to form the chip.

Figure 2:
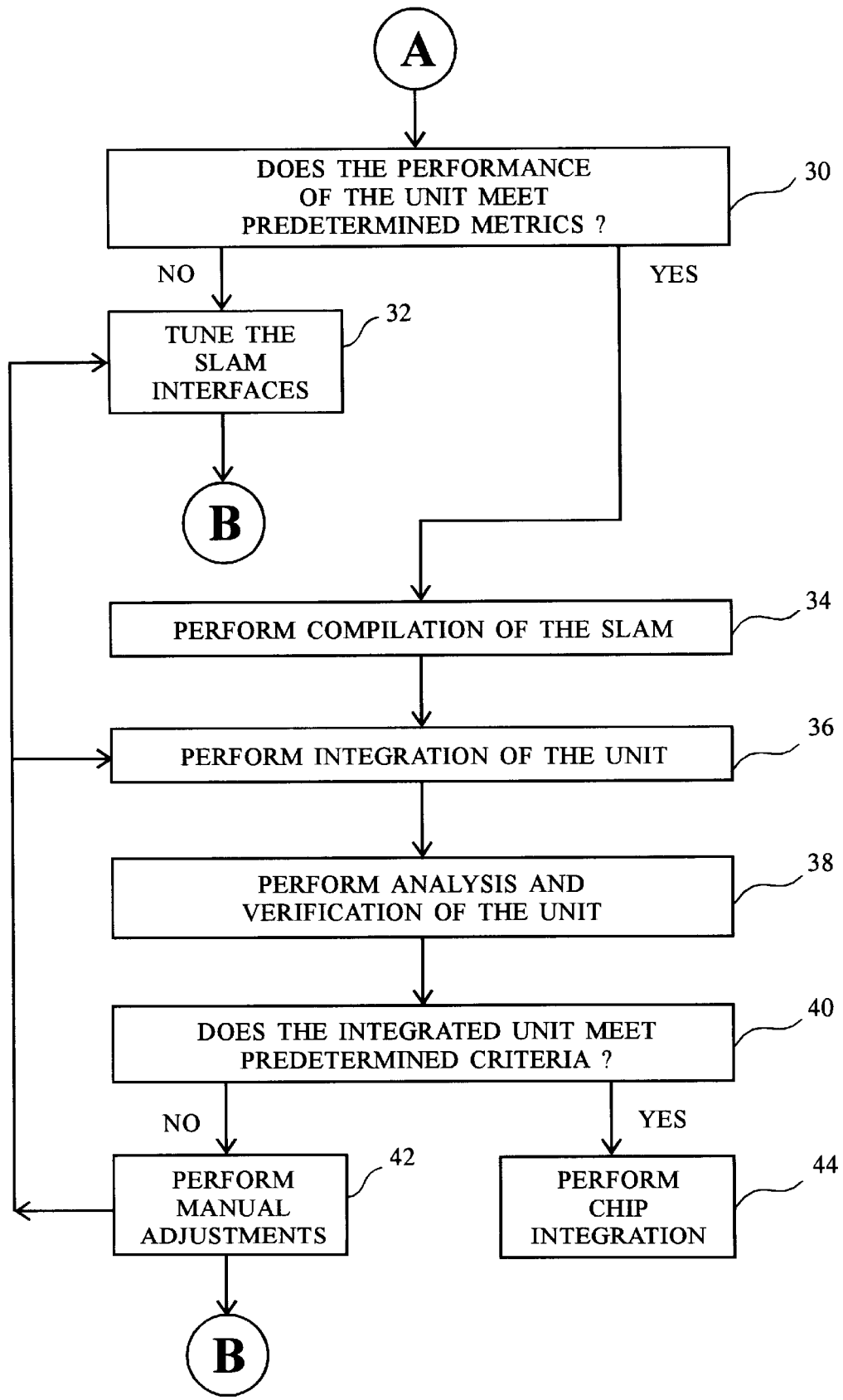

As shown in FIGS. 1–2, the disclosed computer-based circuit synthesis method includes the steps of receiving in step 10 a complete logic specification of a unit to be generated; and performing partitioning of the unit in step 12, since a unit is typically too large to be implemented as a single SLAM. Accordingly, the logic is to be divided into partitions to be efficiently implemented. SLAM structures generally have a much coarser granularity than standard cell-based approaches, such as Random Logic Macros (RLMs), and hence warrant specialized partitioning techniques.

PARTITIONING

In an illustrative embodiment, the step 12 of partitioning is performed automatically by the computer-based circuit synthesis method using automatic partitioning techniques known in the art; for example, by use of a computer program based on logic synthesis principles such as the techniques described in commonly assigned U.S. patent application Ser. No. 08/437,918 entitled "LOGIC SYNTHESIS FOR LOGIC ARRAY MODULES", which is incorporated herein by reference.

In an alternative embodiment, the step 12 of partitioning may be done manually using, for example, an interactive partitioning method for requesting and processing inputs from a designer.

In performing the step 12 of partitioning, the disclosed method divides the logic into partitions to fit within heuristically determined limits. These limits restrict the maximum complexity to be supported by the resulting SLAM structure. The partitioning is performed within predetermined limits on the maximum complexity to be supported by the resulting SLAM structure.

As described below, design changes may be implemented in the logic specifications received in step 10. After design changes, when the partitioning step 12 is performed, manual partitioning may be used as a preferred partitioning technique, since the design changes may be relatively small and/or incremental. The step 12 of partitioning may typically be performed manually by a designer who edits textual descriptions of the logic in a high level design language, for example, the VHDL design language, in a manner known in the art.

The step 12 of partitioning generates a set of logic partitions where each partition represents the logic description for a single SLAM.

MAPPING LOGIC PARTITIONS

The disclosed method processes and optimally maps each logic partition to a corresponding appropriate SLAM structure in step 14. In an illustrative embodiment, the mapping in step 14 is performed by initially converting the description of the logic partition to a two-level AND-OR representation in the form of a specification of connections between AND and OR gates. Such a two-level AND-OR representation is then processed by logic minimization processes known in the art, such as the processes described in R. K. Brayton et al., "Logic Minimization Algorithms for VLSI Synthesis", Kulwer Academic Publishers, 1984; which is incorporated herein by reference. The result of the minimization process is an optimal two-level AND-OR representation implementing the logic specified for each partition, but the generated two-level AND-OR representation does not match the structure of the SLAM.

Accordingly, the step 14 of mapping includes the step of convert the two-level AND-OR representation to a representation matching a structure of a SLAM. A SLAM is comprised of different arrays as described in the commonly assigned U.S. patent application entitled "COMPILED SELF-RESETTING CMOS LOGIC ARRAY MACROS", which is being filed concurrently with this application, and which is incorporated herein by reference.

In an illustrative embodiment, Boolean transformations are performed in step 14 to convert, in a first conversion step, the two-level AND-OR structure to a FIRST OR—STROBED INVERTER—SECOND OR format, which is then converted, in a second conversion step, to a FIRST OR—STROBED LOGIC GATE—SECOND OR format. STROBED INVERTER, STROBED LOGIC GATE, FIRST OR, and SECOND OR are terms described in the commonly assigned U.S. patent application entitled "COMPILED SELF-RESETTING CMOS LOGIC ARRAY MACROS", which is being filed concurrently with this application, and which is incorporated herein by reference.

The second conversion step may be implemented by the following sub-steps:

1. All of the FIRST OR—STROBED-INVERTER circuits which connect to the same combination of SECOND OR circuits are combined using strobed logic gates, which generate the OR of the logical inverse, i.e. the complement, of their inputs, with fan-in limitations of the strobed logic gates being taken into account.

2. The inputs of all OR gates which connect to the inputs of strobed logic gates are analyzed for common signals, such that a set of inputs, common to all the input OR gates, is removed to become the inputs to a new OR gate. The strobed logic gates are now modified to produce the AND of the inverse of the new gate and the OR of the inverse of all the other first OR circuits. This step is analogous to factoring out a common term from an AND-OR representation.

3. For any single-input first OR gates which connect to OR inputs of one strobed logic gate, such single-input first OR gates are combined into at least one first OR gate, and then the output of the at least one first OR gate is connected to the input of at least one strobed logic gate, without inversion.

The step 14 of mapping further includes the step of selecting a timing input for each SLAM, which is used to generate the timing signals for the various strobed logic gates. "TIMING INPUT" and "TIMING SIGNAL" are defined and described in the commonly assigned U.S. patent application entitled "COMPILED SELF-RESETTING CMOS LOGIC ARRAY MACROS", which is being filed concurrently with this application, and which is incorporated herein by reference. If timing inputs are not specified externally, for example, in logic specification received in step 10, then the input with the largest internal fan-out may be selected, as a default selection, to be the timing input. Several different timing signals may then be derived from the selected timing input. Once the timing input is selected, an appropriate timing signal for each strobed logic gate is selected.

In performing such sub-steps, the step 14 of mapping optimizes and transforms the logic for the SLAM into a form for efficient implementation to be a SLAM structure.

SLAM CONFIGURATION AND LAYOUT

The disclosed method then creates a configuration and relative layout in step 16 for each SLAM, which includes the mapping generated in step 14 with some additional information. The configuration and relative layout created in step 16 includes:

1. the logic gates which make up the SLAM, including input buffers, logic gates in first or second OR arrays, strobed logic gates, and output buffers;
2. the input and output pins of the SLAM;
3. the connections between the different pins and gates; and
4. the relative positions of all the above components.

The configuration and relative layout is created in step 16 by estimator programs and techniques known in the art to accurately estimate the size, aspect ratio and performance of each SLAM. Such estimates are substantially close to the actual values, and are determined with relatively high speed. In an illustrative embodiment, the configuration and relative layout does not include information about support structures such as reset generators and timing signal generators, but the effects of such support structures are taken into account by the estimator programs and techniques in creating the estimates of the resulting SLAM structures.

In generating the relative configuration and layout in step 16, the disclosed method uses knowledge about the size and shape of the tiles, which form the SLAM structures, to determine an optimal spatial ordering of the different tiles that make up each array determined in the step 14 of mapping.

Using the configuration and relative layout of each SLAM created in step 16, various electrical parameters may also be estimated, such as the parasitic capacitances on various wires and pins, with the sizes of devices calculable based on the estimated parasitic values. Since the timing input has been selected, estimates of the timing of the different signals and sizes of delay chains may also be calculated.

Based on such electrical parameter information, the various tiles are associated with parameters which determine the sizes of the devices and elements of which the tile is composed. The sizes may be determined based on equations which have been derived from simulation results, using simulation techniques known in the art. Once the tile sizes are known, the overall shape and size of the SLAM may then be determined.

CREATION OF EXTERNAL DESCRIPTIONS

For the disclosed method to perform the actual physical compilation of the unit, a description of each SLAM is required, which may be estimates of the final SLAM implementation. In step 18, the disclosed method generates such descriptions of each SLAM by analyzing the configuration and relative layout created during step 18 using analysis techniques known in the art.

In step 18, the external descriptions are created and expressed by the disclosed method, in the illustrative embodiment, in the form of computer files to include the following descriptions:

1. A physical shadow; i.e. a block representation of the SLAM with size, shape, and pin locations for floor planning and other physical design activities.
2. A timing model; i.e. a representation including delay rules describing the input-to-output delay behavior of the given SLAM, which is used to perform static timing analysis of the entire unit to create estimates using rules based on knowledge about the design targets, such as buffer requirements and loading of the internals and externals of the given SLAM.
3. An interface description, which is used to ensure that different communicating macros, such as SLAMs and non-SLAMs, have compatible interfaces. The interface description includes the types of signals involved, i.e. pulse signals or static signals; the phases and active levels of the signals; the design values for load capacitance, etc.

INTEGRATION OF THE SLAMS

The disclosed method then performs integration of the SLAMs with other macros in step 20 to build a complete netlist for the unit being produced, using the available external descriptions for SLAMs and other macros generated, for example, in step 18. External descriptions for macros designed using other methods may be provided from other sources in step 20, such as macros produced by customized design processes, and macros produced by the method described in the commonly assigned U.S. patent application entitled "A METHOD AND APPARATUS FOR GENERATING BIT-SLICE MACROS", which is being filed concurrently herewith and which is incorporated herein by reference.

In performing the integration in step 20, the disclosed method recombines individual partitions generated in step 12 to form the unit being constructed.

RESOLVE INTERFACE MISMATCHES

The disclosed method then analyzes the constructed unit generated by step 22 to determine consistency of the unit.

Since each SLAM is treated individually during steps 14–18, SLAMs communicating with other SLAMs may have mismatched interfaces; for example, the output of one SLAM may be active high for a given operation, while a destination SLAM may expect an active low signal for the same operation.

In step 22, the consistency of communicating interfaces is checked by analyzing all of the pins connected to each element at the unit level using a specialized computer program using techniques known in the art for implementing rules describing various permitted combinations of interfaces. The disclosed method resolves the mismatches and conflicts by determining interface changes to be implemented, and by implementing greedy algorithms which performed the smallest number of changes to the interfaces. Such greedy algorithms may include methods known in the art, such as described in Cormen, Leiserson and Rivest, "Algorithms", McGraw Hill, 1990, pp. 329–350.

In the illustrative embodiment shown in FIG. 1, if interface mismatches and conflicts are detected in step 22, the disclosed method then resolves interface mismatches in step 24, and changes the external SLAM specifications in step 26, as described below. If no interface mismatches are detected in step 22, the disclosed method proceeds to analyze the performance of the unit in step 28, as described below.

Alternatively, certain interface conflicts may be indicated to a designer for manual resolution using, for example, error messages and/or prompts through a computer interface with the user. Such interface conflicts for manual resolution may occur because some inputs or outputs may be indicated as being fixed or locked, thus indicating that signals from such inputs or outputs may not have their characteristics changed. For example, macros implemented using custom techniques usually do not allow their interfaces to be changed without re-design. Accordingly, in an alternative embodiment, after detection of mismatches in step 22, the disclosed method may provide a user with error messages and/or prompts, and may interactively allow the user to resolve such interface conflicts, in a manner known in the art.

CHANGE EXTERNAL SLAM SPECIFICATIONS

In the illustrative embodiment as shown in FIG. 1, if interface mismatches and conflicts are detected in step 22, the disclosed method resolves such interface mismatches in step 24 and changes the external SLAM specifications in step 26 to change the interfaces of the SLAMs using the interface changes generated in step 24, and looping back to provide steps 14–16 with external constraints corresponding to such interface changes. The disclosed method implements steps 14–16 using adaptive computer programs and techniques which respond to such external constraints to repeat the operations of steps 14–16 with such external constraints, and to generate a new iteration of external specifications implementing such interface changes.

Accordingly, steps 14–26 are repeated until all interface mismatches resulting in new design constraints are resolved, so that the disclosed method proceeds to step 28.

In an alternative embodiment, the looping from step 26 to steps 14–16 may be contingent upon approval by a designer, through user input, who analyzes messages generated by step 22 to determine whether design changes or changes to custom macros are required before re-entering steps 14–16. If the designer disapproves of such looping, design changes may be implemented, and the method re-starts from step 10.

ANALYZE PERFORMANCE

When step 28 is initiated, the disclosed method has generated a unit with descriptions including a set of SLAMs with compatible interfaces. The performance of the entire unit is then analyzed in step 28 using performance analysis techniques known in prior art.

The disclosed method then determines in step 30 if the performance of the unit meets a set of predetermined metrics, including the illustrative metrics described below:

1. Cycle time, which is evaluated through static timing analysis to determine if the unit completes all of its operations and actions correctly within a predetermined cycle time. The cycle time for a given unit may be estimated by techniques in the prior art using static timing analysis described, for example, in R. B. Hitchcock et al., "Timing Analysis of Computer Hardware", IBM JOURNAL OF RESEARCH AND DEVELOPMENT, VOL. 26, pp. 100–105, January 1992; which is incorporated herein by reference.

2. Wireability, in which all connections between the macros of a unit are evaluated as being complete or incomplete, using evaluation methods such as described in B. Preas and M. Lorenzetti, "Physical Design Automation of VLSI Systems", Benjamin-Cummings Publishing Company, 1988, which is incorporated herein by reference.

3. Area, in which the entire unit is determined to fit or not fit within a predetermined allocated area budget, so that the chip may be built within a chip area budget. The fit within the chip area budget may be determined using evaluation methods such as described in B. Preas et al., supra, which is incorporated herein by reference.

4. Power, in which the total power consumed by the unit is determined to be within or outside of a predetermined allocated power budget. Power estimates for each SLAM may computed by a computer program using power estimation techniques known in the art. The power consumption of a macro may vary by at least an order of magnitude depending on the logical values applied to the inputs of the unit. Through circuit simulation of the various components assembled to constitute the macros, heuristics are provided using simulation techniques in the prior art which allow the power consumed by any macro to be estimated for a given set of inputs.

The average power may be calculated by simulation of many random patterns and by calculating the power consumption for each pattern, such that the patterns which consume maximum and minimum power are stored and optimized using a standard hill climbing algorithm known in the art to yield estimates of the global maximum and minimum powers.

5. Transition times, which is important when long wires are present in the unit. For the circuits of the unit to function correctly, the inputs to each macro are to meet certain transition time constraints which, if not met, may result in an erroneous predicted delay of the macro. Macro transition times are computed using techniques described, for example, in commonly assigned U.S. patent application Ser. No. 08/497,175, entitled "INTERCONNECT AND DRIVER OPTIMIZATION FOR HIGH PERFORMANCE PROCESSORS", which is incorporated herein by reference.

6. Pulse overlap constraints, which are used in units which involve pulse mode signaling, since, if such constraints are not met, the circuits of the unit may not operate properly, as described in V. Narayanan, B. Chappell, and B. Fleischer, "Static Timing Analysis of Self-Resetting Circuits", IEEE INTERNATIONAL CONFERENCE ON COMPUTER AIDED DESIGN, 1996.

7. Setup and hold constraints, which are timing constraints used for correct operation of the circuits of the unit, as opposed to the cycle time constraints which determine the overall performance of the unit. Such setup and hold constraints are imposed at different macro boundaries to ensure proper operation and performance, as described in V. Narayanan, B. Chappell, and B. Fleischer, "Static Timing Analysis of Self-Resetting Circuits", IEEE INTERNATIONAL CONFERENCE ON COMPUTER AIDED DESIGN, 1996.

If all of the metrics have not met in step 30, the disclosed method performs step 32, as described below; otherwise, if all of the metrics have been met in step 30, the disclosed method performs step 34, as described below.

TUNE SLAM INTERFACES

In an illustrative embodiment, in step 32, the disclosed method performs automatic adjustments to tune the SLAMs and their interfaces to met the predetermined metrics evaluated in step 30. In an alternative embodiment, such tuning may be performed manually by a designer in response to messages and prompts by the disclosed method.

The step 32 of tuning may include the following sub-steps:

1. Select a new timing input, in which an initial default selection of the timing input based on the internal fan-out of the various inputs is modified, such that the selected timing input is the signal which arrives last or latest during normal operation. The determination of the latest arriving signal may be performed by static timing analysis, as described in the prior art.

2. Pad the timing input, which is performed when the latest of the input signals is not readily determined, for example, due to uncertainty in delay modeling by the disclosed method. If a signal other than the signal from the selected timing input can arrive later than the timing input, delay padding is added to the timing input to ensure that internal sampling is accurately performed.

3. Tune drivers to a load, which is performed by modifying the interconnections between the various macros determined from the floor plan; i.e. the physical location and shape, of each macro for the entire unit which is generated in step 20. The disclosed method then sizes the buffers which drive the interconnections, and tunes the wire sizes based on the sizes of output buffers, using, for example, techniques described in commonly assigned U.S. patent application Ser. No. 08/497,175, entitled "INTERCONNECT AND DRIVER OPTIMIZATION FOR HIGH PERFORMANCE PROCESSORS", which is incorporated herein by reference.

4. Tune input buffers, which is performed by evaluating the requirements of the input pulses for various available input buffer choices which have different pulse constraints.

Upon performing the above sub-steps (1)–(4) in step 32, the disclosed method then branches to perform steps 26 and thence steps 14–16, as described above, and so to loop through steps 14–32 until the predetermined metrics are met in step 30 to proceed to step 34.

COMPILATION

The disclosed method then performs compilation of the SLAM in step 34 by applying a circuit compiling routine to the configuration and relative layout generated in step 16. The compiling step 34 creates a verified physical and schematic description of each individual SLAM in the unit by the following sub-steps:

1. Generate a mosaic, by converting a structural description of the unit into an arrangement of tiles, in which each tile represents a pre-designed basic building block with schematic and layout information, and in which each tile is parameterized. The mosaic comprises several arrays of tiles, in which each tile has associated properties to indicate how the parameters are to be applied and implemented. The associated properties are selected based on performance targets determined during, for example, steps 28–32.

The computer system implementing the disclosed method includes a library of available tiles. The mosaic includes implementations of such tiles from the tile library, as well as all support structures for each tile. The implementations of tiles as well as the associated support structures distinguish the mosaic from the configuration and relative layout generated in step 16.

2. Generate a schematic, by instantiating; i.e. using, all of the tiles with appropriate parameters, and by interconnecting or stitching together all of the tiles to create a circuit level schematic for the SLAM. Accordingly, the disclosed method generates the schematic from the mosaic.

3. Generate a layout, by implementing the layout for each tile in the mosaic with the appropriate parameters, and the tiles are stitched together to create the layout for the entire SLAM. External pins are also generated as appropriate. Accordingly, the disclosed method generates the layout from the mosaic.

4. Verify the schematic and layout, by performing various verification steps known in the art to ensure that the layout and schematic generated in the previous sub-steps (1)–(3) are accurate. Specifically, the following verification steps are performed:

a. The logic description of the unit is checked against the schematic to ensure that the functions implemented by the schematic are the same as the functions specified in the high level logic description. This verification step may be performed using the verification methods known in the art, such as described, for example, in A. Kuehlman et al., "VERITY: A Formal Verification Program for Custom CMOS Circuits", IBM JOURNAL OF RESEARCH AND DEVELOPMENT, pp. 149–166, March 1995; which is incorporated herein by reference.

b. The schematic and layout are checked against each other to ensure that the layout accurately represents the schematic function. This is done using techniques known in the art, such as described, for example, in B. Preas et al., supra.

c. The layout is checked to ensure that there are no violations of predetermined technology design rules, using techniques known in the art, such as described in B. Preas et al., supra.

d. Parasitics are extracted from the layout and checked against the parasitics in the schematic to ensure that such parasitics are consistent with each other.

e. The performance of the generated schematic is checked by generating and applying worst case simulation patterns using circuit simulations. Such worst case simulation patterns may be selected by delay modeling, as described below.

After compilation in step 34, the disclosed method then performs design integration on the unit in step 36, in which the layouts of the SLAMs are combined with the layouts for all other macros which may be designed in other styles. The connections between the various macros are completed in step 36, typically using a global routing program known in the art, to generate a complete layout for the unit logic.

The disclosed method then performs analysis and verification of the unit in step 38 to analyze whether any predetermined design rules have been violated, and whether the performance of the unit has accounted for layout effects. Also, the implementation of the unit is checked against all previous specified budgets, such as the cycle time. In addition, the step 38 may also perform the analysis for the entire unit in a manner similar to step 28 as applied to individual SLAMs.

The disclosed method then checks the results of the analysis and verification in step 38 to determine in step 40 whether the integrated unit meets the predetermined criteria; i.e. whether design rules were violated, whether the implementation meets previously specified budgets, etc.

PERFORM MANUAL ADJUSTMENTS

If the integrated unit does not meet the predetermined criteria in step 40, the disclosed method performs step 42 to allow a designer, by a prompt or displayed messages, to perform manual adjustments, and the disclosed method then branches to step 32 to tune the SLAM interfaces and/or to re-compile the SLAMs in step 34 in response to the manual adjustments.

Alternatively, after step 42, the disclosed method may allow the designer to make design changes to the logic specifications of the unit, and the disclosed method restarts in step 10 to repeat steps 10–42 with the input design changes until step 40 determines that the integrated unit meets the predetermined criteria to perform step 44. In this manner, the automatic processing of the SLAMs is supplemented by manual input for improved design implementation.

FINAL CHIP INTEGRATION

In performing step 44, the disclosed method integrates many different units to form the entire chip. In an illustrative embodiment, the disclosed method in step 44 generates a complete chip specification based on the final integration of the units and SLAMs thereof, in the form of, for example, computer files providing a netlist or other specifications of the components and interconnections therebetween.

COMPILATION OF CIRCUIT TILES, MOSAICS AND MACROS

In step 34 of the disclosed method, compilation of SLAMs from tiles to form a unit is performed. Such compilation is described in greater detail below.

TILES

As described herein, a tile controls a portion of a macro and includes:

1. a physical view which represents a portion of the macro layout;
2. a symbolic view which represents a corresponding portion of the macro schematic;
3. a set of parameter definitions which control the physical and symbolic views, including a definition of the valid parameter space; and
4. code and database information which predict certain critical characteristics of the physical and symbolic views over the valid parameter space.

The tiles may be custom designed, and a set of standard tiles may be stored in a tile library. Each tile is designed for optimal timing and area characteristics. FIGS. 3A–3C show symbolic views of a sample tile with representative components for three different parameter values, and FIGS. 4A–4C show respective physical views corresponding to the symbolic views shown in FIGS. 3A–3C, in which the representative components are implemented on a semiconductor structure.

The tiles shown in FIGS. 3A–4C may be, for example, part of a simple dynamic multiplexer. The tiles may represent, for example, one portion of the multiplexer, with different implementations between tiles being based on the parameters of the tile which specify whether the data input is from a pin, from a logic source corresponding to a constant 1, or from a logic source corresponding to a constant 0.

FIG. 3A shows an illustrative embodiment of a tile 46 representing a circuit for processing any data input from a pin, so a constant value (CVALUE) parameter is unspecified and may be denoted by an X. Another parameter CONST may indicate whether the CVALUE parameter is true or false, so for the tile 46, CVALUE=FALSE. Accordingly, the tile 46 includes components such as transistors and capacitors for processing any data input from a pin having a non-constant value.

FIG. 3B shows an illustrative embodiment of a tile 48 representing a circuit for processing a data input with a constant 1 as an input, which may be a high signal using, for example, positive logic. Accordingly, CVALUE=1 and CONST=TRUE for the tile 48. Accordingly, as the tile 48 provides a constant 1 value, the structure of the tile 48 is relatively simpler than the structure of the tile 46 in FIG. 3A; i.e. the tile 48 includes two capacitors and a transistor driven by the data input, in an illustrative embodiment.

FIG. 3C shows an illustrative embodiment of a tile 50 representing a circuit for processing a data input with a constant 0 as an input, which may be a low signal using, for example, positive logic. Accordingly, CVALUE=0 and CONST=TRUE for the tile 50. Accordingly, as the tile 50 provides a constant 0 value, the structure of the tile 50 is relatively simpler than the structure of the tile 48 in FIG. 3B; i.e. the tile 50 includes two capacitors and no transistors driven by the data input, in an illustrative embodiment.

As shown in FIGS. 4A–4C, the physical view of a tile includes all mask shapes within the region it controls. Such elements include, for example, wires connected to components such as transistors, as in the mask shape 52 in FIG. 4A, or wires passing through the region without connection to any devices, as in the mask shapes 54, 56 shown in FIGS. 4B–4C, respectively, with such unconnected wires providing, for example, only a capacitance. Elements may be optionally included, deleted, reshaped, or re-sized in each specific implementation of a tile, by setting parameter values. Parameter values may control the connections of a device to which of several wires; the width and length of any transistors; and even the size and shape of the layout region controlled by the tile.

The symbolic views shown, for example, in FIGS. 3A–3C include all active and passive circuit elements in a corresponding portion of the macro, including parasitic elements. All wires present in the physical view are included in the symbolic view, for example, as capacitors. For all parameter values within the valid parameter space, the circuit represented by the symbolic view is consistent with the mask data in the physical view including values of all components, circuit topology and connectivity, and interfaces to adjacent tiles. It is to be noted that the values of the parasitic elements in the symbolic views; i.e. the values of the capacitances shown in FIGS. 3A–3C, are different based on the underlying circuit.

The computer code and database information for implementing the disclosed method on a computer system allow various tile information about the parameterized symbolic and physical views to be determined, including node capacitances, layout dimensions and device parameters. Such properties of the tiles may be generated by software without instantiating tiles and analyzing the mask data or schematics directly.

As shown in FIGS. 4A–4C, the disclosed method may implement the components shown in the physical views differently based on the parameters of each tile. For example, when the parameter CONST=TRUE, the relative width of the tiles 54–56 is reduced to be less than the relative width of the tile 52, in order to save area in macros using such tiles 54–56. In an illustrative embodiment, although the CVALUE parameter varies between tiles 52–56, the width of the tiles 52–56 is not dependent on the CVALUE parameter, since a multi-bit constant may be a sequence of logic 0 values and logic 1 values.

MOSAICS

In forming a macro, the tiles are arranged in various one-dimensional or multi-dimensional arrays of similar, but not necessarily identical, tiles. Signals are conveyed from one tile to another by abutment in both the physical and symbolic views. In both the physical and symbolic views, such arrays constitute the mosaic of a macro.

Tile parameter values are set by considering such items as: the desired function, bit count, word width, and the performance of the macro; the desired drive strength, polarity and timing of each macro output; desired tuning a of internal nodes and the parasitic capacitance and resistance of lines internal to the macro as predicted from the computer code and database information for the tiles in the macro.

Once the mosaic is complete, the computer code and database information may be used to calculate the external behavior of the macro such as input capacitances, output drive strengths, performance information including delays and timing requirements, macro power consumption, dimensions and final pin locations.

ASSEMBLY OF MACROS FROM TILES

Figure 5:
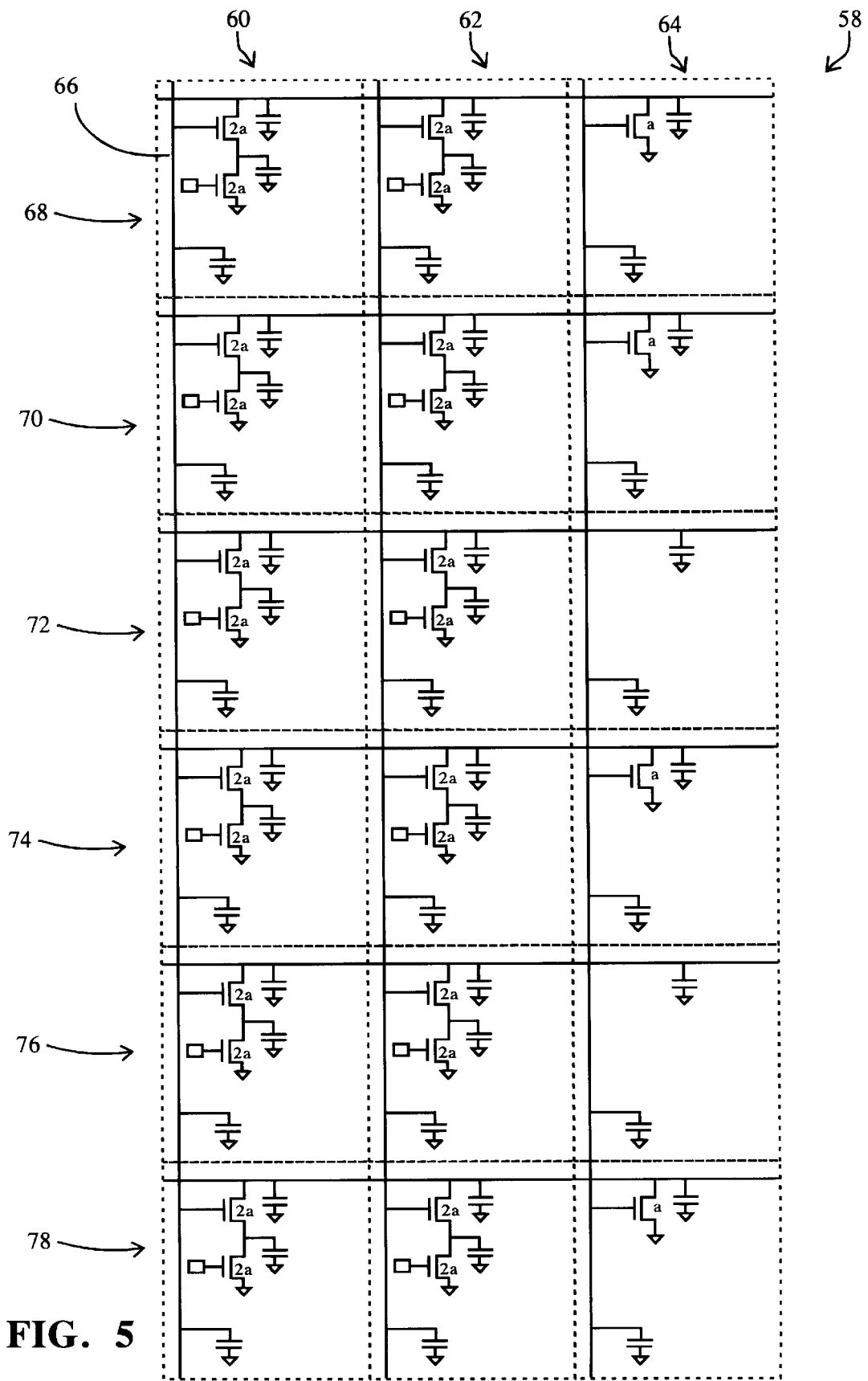
FIG. 5 is a circuit schematic of a mosaic of tiles for a macro.
Figure 6:
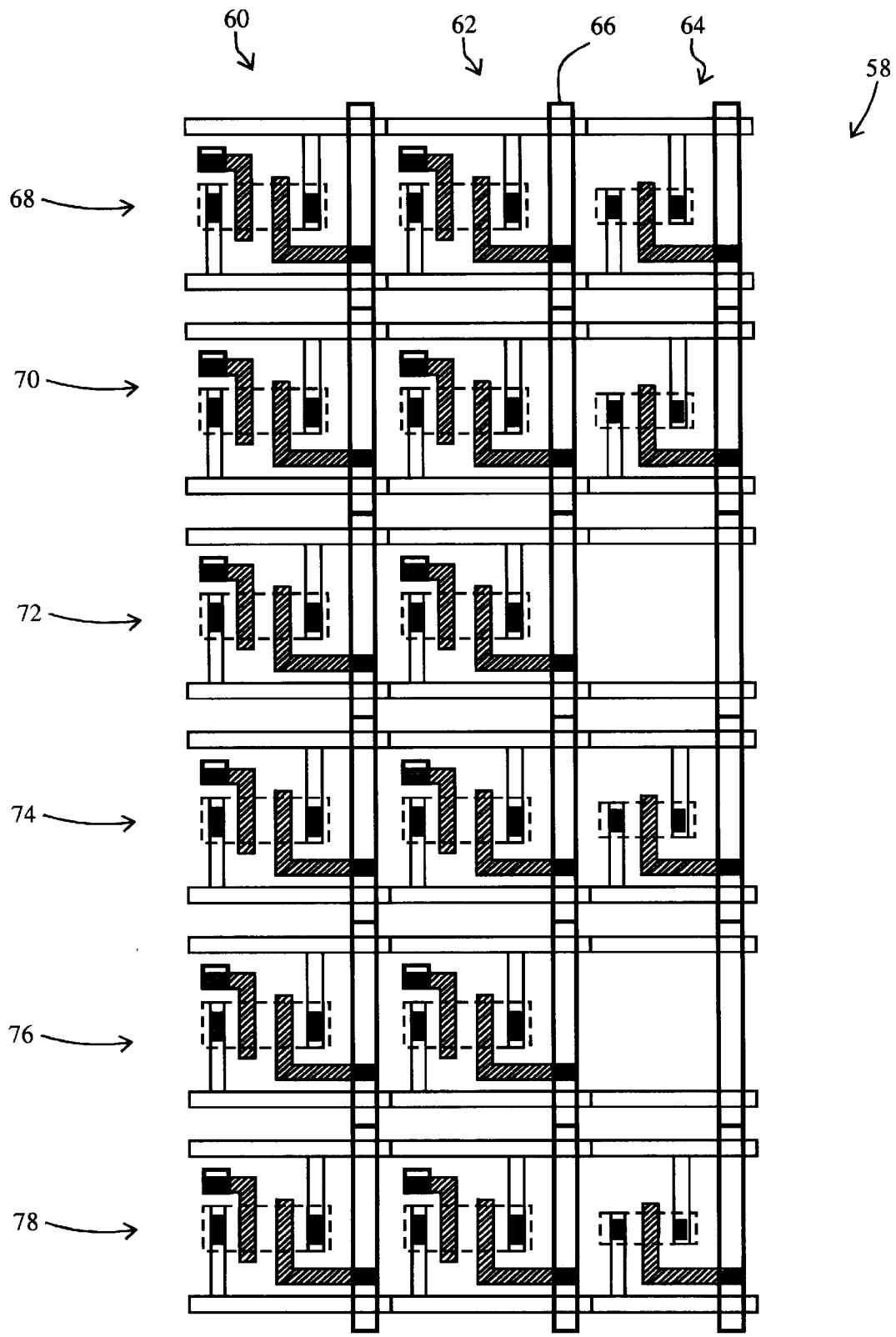
FIG. 6 is a top plan physical view of the set of tiles of FIG. 5 forming the layout of a macro.

When a macro is being assembled from a mosaic, the physical view is obtained by implementing the layouts for each tile taking the respective parameters of each tile into account, and stitching together or interconnecting the tiles to form arrays. FIGS. 5–6 are illustrative embodiments of an array of tiles forming a multiplexer 58 in a symbolic view and in a physical view, respectively, using tiles such as the tiles shown in FIGS. 3A–3C, and FIGS. 4A–4C, respectively. Each of the columns 60–64 of tiles in FIGS. 5–6 represents a 6-bit word, with a 6-bit word being selected by a signal on the vertical wires, such as the vertical wire 66. Each of rows 68–78 is a bit position in the multiplexer 58.

For example, referring to FIG. 5, the tile parameters for the third word in the column 64 may be set to give a constant 110101, reading from the top down. External pins and other information required by the chip integration methods may be added based on marker layers in the physical view and/or tile parameters.

The macro schematic for the physical view in FIG. 6 of the multiplexer 58 is obtained similarly by implementing the symbolic views for each tile to generate respective circuit schematics as in FIGS. 4A-4C, and stitching together the resulting schematic pieces to form the macro schematic shown in FIG. 5, corresponding to the layout in FIG. 6. In the illustrative embodiment, the tile boundaries are consistent between FIGS. 5 and 6, and the tile boundaries in place and the values of the parasitic capacitances have been omitted from FIGS. 5–6 for better understanding. Wire labels and connectivity information may be assembled from parameter values and information in the symbolic views of the tiles.

Because the physical and symbolic views of each tile are consistent within the valid parameter space, macro verification such as layout-vs-schematic checking, circuit simulation, design rule checking, electrical rule checking, and parasitic element comparison become a formality, as the macros are implemented to be correct by construction. Since all internal macro connections are created from wires controlled by the tiles rather than being routed as in current standard cell or gate array techniques, parasitics may be modeled accurately without the need for parasitic extraction from the final layout. Therefore, the memory-intensive processes in computer-based systems for generating layouts for the macros is reduced.

DELAY ESTIMATION

In building a pulsed-logic system, it is important to have accurate knowledge of the range of delays through a macro. The delay of a dynamic gate depends on the pattern of inputs driving it. A delay model of each assembled macro is constructed by assembling delay models of the individual gates within it, as is done in standard static CMOS methodologies. Then, the maximum and minimum delays are obtained by summing the maximum and minimum delays of the individual gates.

To achieve the estimation accuracy necessary for pulsed-logic systems, as described above for step 32, the disclosed method estimates the maximum and minimum achievable delays in a macro. The model of the assembled macro is derived from heuristic models of the components as individual dynamic gates. When the worst-case delay path is identified, a pattern generation procedure is invoked to generate input patterns to achieve the worst-case performance. The pattern generation procedure sets target logic values on internal nodes, and sets a consistent set of logic values to the input of the gates which drive such internal nodes which have such targets.

Whenever the pattern generation procedure determines a logic value for a node, the effects of the logic value are propagated to all other nodes within the macro, using standard logic simulation techniques known in the art. Once all logic values are set, the actual delay of the macro is estimated using the resulting input pattern. If this delay is less extreme than an anticipated worst-case performance, the pattern generation procedure repeats for further iterations to search for more paths with a worst-case performance worse than the actual performance observed in previous iterations.

Once no paths exist which generate a worse performance than observed from an actual input pattern, the worst delay observed is the worst-case achievable delay.

While the disclosed computer-based synthesis method has been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A method for compiling and optimizing high performance control logic from a high level design language logic description using self-resetting complimentary metal oxide semiconductor (SRCMOS) logic array macros (SLAMs), comprising the steps of:

(a) partitioning the logic description of a unit into blocks that are suitable for mapping to a target SLAM structure;

(b) mapping each logic partition to the target SLAM structure wherein the mapping includes the steps of:

(b1) optimizing each logic partition using a two-level logic optimization technique:

(b2) mapping the resulting two-level logic description of each logic partition to a FIRST OR—STROBED INVERTER—SECOND OR format by Boolean transformations; and (b3) converting the FIRST OR—STROBED INVERTER—SECOND OR format into FIRST OR—STROBED LOGIC GATE—SECOND OR format by combining related circuits;

(c) creating a configuration and relative layout for the internal structure for each SLAM;

(d) creating an external description for each SLAM, each description being of sufficient detail to carry out physical design and integration of the unit which contains the SLAM;

(e) assembling the partitions implemented as SLAMs with other macros in the unit;

(f) resolving interface conflicts between the different macros by selecting appropriate signal interfaces for various SLAMs;

(g) changing the external specifications of the various SLAMs, and repeating stages (b)–(f) as necessary;

(h) analyzing the performance of the unit;

(i) if the step (h) of analyzing determines that the unit does meet the predetermined metrics, automatically compiling the schematic and layout of each individual SLAM within the unit based on the configuration and relative layout created in step (c); and (j) assembling the various macros that comprise the unit and analyzing the design of the unit for design rule violations.

2. The method of claim 1 further comprising, after step (h), the step of:

(h1) if the step (h) of analyzing determines that the unit does not meet predetermined metrics, tuning the interfaces of the various SLAMs and changing specifications for various SLAMs as necessary and repeating steps (c)–(h) as appropriate.

3. The method of claim 1 further comprising, after step (h), the step of:

(h1) making global design changes and repeating steps (a)–(h) as necessary.

4. The method of claim 1 further comprising, after step (j), the steps of:

(k) analyzing the performance of the unit; and (l) if the performance in step (k) is not satisfactory, making incremental design changes and repeating steps (i)–(k) as necessary.

5. The method of claim 1 further comprising, after step (j), the steps of:

(k) analyzing the performance of the unit; and (l) if the performance in step (k) is not satisfactory, tuning interfaces of various SLAMs and repeating steps (b)–(j) as appropriate.

6. The method of claim 1 further comprising, after step (j), the steps of:

(k) analyzing the performance of the unit; and (l) if the performance in step (k) is not satisfactory, making global design changes and repeating steps (b)–(j) as appropriate.

7. The method of claim 1 further comprising, after step (j), the steps of:

(k) analyzing the performance of the unit; and (l) if the performance in step (k) is not satisfactory, making global design changes and repeating steps (a)–(j) as appropriate.

8. The method of claim 1, further comprising the steps of:

(k) assembling the unit with the rest of the chip; and (l) analyzing the chip including the unit for satisfactory performance.

9. The method of claim 1, wherein the step (c) of creating the configuration and relative layout for the internal structure of each SLAM comprises the steps of:

(c1) choosing the timing input to be the input specified by the external specification for this SLAM or to be the input with the largest internal fan-out in the absence of such specification;

(c2) selecting the timing signal for each strobed logic gate;

(c3) determining an optimal ordering of the first OR terms, strobed logic gate terms and second OR terms such that wireability is improved by reducing wire lengths between the different parts of the SLAM; and (c4) generating the configuration and relative layout of the SLAM from results of the preceding steps.

10. The method of claim 1, wherein the step (d) of creating the external description of each SLAM comprises the steps of:

(d1) analyzing the configuration and relative layout to create an estimate of the parasitic capacitances present on buffered inputs, reset signals, timing signals and strobed logic gate outputs;

(d2) determining the required transistor sizes necessary to meet delay and signal transition time requirements given the parasitic capacitances;

(d3) analyzing the configuration and relative layout to create an estimate of the external characteristics of the SLAM; and (d4) generating external specifications based on the above estimate.

11. The method of claim 1, wherein the step (b3) of converting the FIRST OR—STROBED INVERTER—SECOND OR format into FIRST OR—STROBED LOGIC GATE—SECOND OR format by combining related circuits, comprising the steps of:

combining FIRST OR—STROBED INVERTER circuits which connect to the same combination of second OR circuits using strobed logic gates which generate the OR of the inverses of their inputs subject to fan-in limitations of such strobed logic gates;

removing sets of inputs which are common to all first OR inputs to a strobed logic gate, adding an additional first OR circuit with those same inputs and modifying the strobed logic gate to generate the AND of the inverse of the new first OR circuit and the OR of the inverses of the other first OR circuits; and combining first OR circuits connected to one input each into one first OR circuit, modifying the strobed logic gate to not invert the output of the first OR circuit.

12. The method of claim 1, wherein step (f) comprises the steps of:

(f1) resolving the interface conflicts between various macros, including the steps of:

(f2) reading interface descriptions of the various macros including SLAMs;

(f3) analyzing the interface description to see if interconnected macros have incompatible external interfaces;

(f4) selecting appropriate interfaces to the SLAMs such that communicating pins have compatible interfaces where possible; and (f5) creating external specifications based on the new external interfaces for the SLAMs.

13. The method of claim 1, wherein the step (i) of tuning the interface for a SLAM comprises the steps of:

(i1) computing the signal arrival times at each input of the SLAM;

(i2) determining a signal that is most likely to arrive latest among all the input signals; and (i3) specifying this signal as the timing input;

(i4) creating external specifications for the SLAM based on the new timing input.

14. The method of claim 1, wherein the step (i) of tuning the interface for a SLAM comprises the steps of:

(i1) computing the pulse characteristics, including arrival time and pulse width, at inputs of each SLAM;

(i2) identifying appropriate input buffer choices at the inputs given the characteristics of the pulses present at the input; and (i3) creating external specifications for the SLAM including the newly identified input buffers.

15. The method of claim 1, wherein the step (i) of tuning the interface of a SLAM comprises the steps of:

(i1) analyzing the output capacitance at each output of the SLAM;

(i2) identifying appropriate output buffer choices at each output; and (i3) creating external specifications for the SLAM including the newly identified output buffers.

16. A method for automatically compiling a schematic and a physical layout of a macro and verifying the correctness of the generated macro, given a relative layout and configuration of different paths of the macro, comprising the steps of:

generating a mosaic of the macro, wherein the macro consists of a set of tiles, the tiles including parameterized building blocks for building a circuit wherein the tiles include a schematic representation and a layout representation of the parameterized building blocks at each position of the tiles;

generating a schematic from the mosaic based on the schematic representation provided by each tile in its relative position with respect to other tiles;

generating a layout from the mosaic based on the layout representation provided by each tile in its relative position with respect to other tiles; and verifying the generated layout and schematic.

17. The method of claim 16, wherein the step of generating a mosaic comprises the steps of:

translating the relative layout and configuration of the macro into a set of homogeneous or heterogenous arrays, where each array represents a section of the macro;

expanding each array into an array of tiles; and setting appropriate properties on the tiles based on performance and area requirements of the macro.

18. The method of claim 16, wherein the step of generating a schematic from the mosaic comprises the steps of:

instantiating the schematic for each tile based on the properties stored in the tile;

stitching the instantiated schematics for the tiles to form arrays of tiles; and stitching the arrays together to form a schematic for the entire mosaic.

19. The method of claim 16, wherein the step of generating a layout from the mosaic comprises the steps of:

instantiating the layout for each tile based on the properties stored in the tile, while preserving their relative layout;

stitching the instantiated layouts for the tiles to form arrays of tiles, while preserving their relative layouts;

stitching the arrays together to form the layout for the entire mosaic, while preserving their relative layout; and adding external pins at appropriate points.

20. The method of claim 16, wherein the step of verifying the generated layout and schematic comprises the steps of:

checking the logic description against the schematic;

generating worst case simulation patterns and checking performance through simulation;

checking the schematic against the layout;

checking the asserted parasitic against the extracted parasitic; and checking that no design rules are violated.

21. The method of claim 20, wherein the step of generating worst case simulation patterns comprises the steps of:

(a) analyzing relevant paths through the macro using heuristics to estimate worst-case performance including, but not limited to, maximum circuit delay, minimum circuit delay, minimum internal. setup times and maximum/minimum loading on reset signals;

(b) analyzing the final set of logic values to estimate the actual performance; and (c) repeating steps (a)–(b) for the next worst path if that path could achieve a worse performance than the actual performance achieved by the final set of logic values.

22. The method of claim 21, further comprising, after step (b), the step of:

(b1) using heuristics to choose logic values for key internal circuit elements to activate the worst-case performance.

23. The method of claim 21, further comprising, after the step (b), the steps of:

(b1) deciding logic values for circuit elements which drive circuit elements with unsatisfied goals; and (b2) propagating these decisions to maintain circuit consistency and to analyze results.

24. The method of claim 17, wherein the macro is a SLAM.

25. A tile stored in a storage device from which the tile may be selected to implement a function in a portion of a macro, comprising:

a symbolic representation of the tile, including symbolic representations of a set of circuit components associated with the tile, which when instantiated represents part of the schematic of the macro;

a physical view of the tile, including physical structures for fabrication on a semiconductor, which when instantiated represents part of the layout of the macro, the symbolic representation and the physical view being provided by each tile such that a relative position of the symbolic representation and the physical view is the same with respect to other tiles in the macro; and a set of parameter definitions which control the behavior of the symbolic and physical views.

26. The tile of claim 25, wherein the symbolic view comprises:

all active and passive elements of the schematic diagram as the components of the tile in that region of the macro, including transistors, parasitic capacitances and resistances, and calls to lower level schematic elements, any or all elements optionally being parameterized using specific values or combinations of values of the tile parameters; and segments of all wires within the region including those wires entering, exiting or passing through the region, where such segments connect by abutment to those in adjacent tiles.

27. The tile of claim 26, wherein any of the elements may be optionally included or removed depending on specific values of the tile parameters.

28. The tile of claim 25, wherein the physical view when instantiated comprises:

mask data for the region of the macro including that for wiring and fabrication of the tile on the semiconductor which enters, exits, or passes through the tile, optionally including instantiations of lower level physical design elements, any or all elements being optionally parameterized depending on specific values or combination of values of the tile parameters.

29. The tile of claim 28, wherein any of the elements may be optionally included, removed or re-sized depending on specific values of the tile parameters.

30. The tile of claim 25, wherein the set of parameter definitions tailor the instantiation of the tile to its particular environmental and operational requirements together with a definition of what constitutes a legal set of values for these parameters.

31. The tile of claim 25, wherein given a valid set of parameters values, the instantiated symbolic and physical views are consistent with each other in the number, size and type of active devices, value of parasitic elements, topology of interconnections and interfaces to adjacent tiles.

* * * * *